US012590556B1

(12) United States Patent
Nath et al.

(10) Patent No.: US 12,590,556 B1
(45) Date of Patent: Mar. 31, 2026

(54) GAS TURBINE ENGINE, FUEL NOZZLE ASSEMBLY, AND METHOD

(71) Applicant: General Electric Company, Evendale, OH (US)

(72) Inventors: Hiranya Kumar Nath, Bengaluru (IN); Steven C. Vise, Loveland, OH (US); Michael A. Benjamin, Cincinnati, OH (US); Narasimha Chiranthan Ranganatha, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/903,579

(22) Filed: Oct. 1, 2024

(51) Int. Cl.
| | |
|---|---|
| *F23R 3/36* | (2006.01) |
| *F02C 3/22* | (2006.01) |
| *F02C 7/22* | (2006.01) |
| *F02C 9/40* | (2006.01) |
| *F23D 17/00* | (2006.01) |
| *F23R 3/14* | (2006.01) |

(52) U.S. Cl.
CPC .................. *F02C 3/22* (2013.01); *F02C 7/22* (2013.01); *F02C 9/40* (2013.01); *F23D 17/002* (2013.01); *F23R 3/14* (2013.01); *F23R 3/36* (2013.01)

(58) Field of Classification Search
CPC .......... F23D 17/002; F23R 3/14; F23R 3/286; F23R 3/36; F23R 3/10
See application file for complete search history.

(56) References Cited

U.S. PATENT DOCUMENTS

| | | | | |
|---|---|---|---|---|
| 2,974,485 | A | * | 3/1961 | Schiefer .................... F23R 3/06 60/758 |
| 4,171,199 | A | * | 10/1979 | Henriques ............. F23D 11/406 431/351 |

(Continued)

FOREIGN PATENT DOCUMENTS

| | | |
|---|---|---|
| CN | 116592397 A | 8/2023 |
| CN | 118463225 A | 8/2024 |

(Continued)

OTHER PUBLICATIONS

U.S. Appl. No. 18/476,595, filed Sep. 28, 2023.

(Continued)

*Primary Examiner* — Lorne E Meade
*Assistant Examiner* — Marc Amar
(74) *Attorney, Agent, or Firm* — Carter, DeLuca & Farrell LLP

(57) ABSTRACT

A gas turbine engine, comprising a compressor section, combustion section, and turbine section in serial flow arrangement, with the combustion section comprising: a combustor liner at least partially defining a combustion chamber; a wall coupled to the combustor liner; a first fuel supply to supply a first fuel; a gaseous fuel supply to supply a gaseous hydrogen fuel; and a fuel nozzle assembly coupled to the wall and fluidly coupled to the first fuel supply and the gaseous hydrogen fuel supply, the fuel nozzle assembly comprising: a main mixer; and a fuel nozzle comprising an outer wall defining a pilot channel and an outer wall fuel orifice to emit at least one of the first fuel or the gaseous fuel radially outward into the main mixer; and a secondary mixer disposed in the pilot channel.

18 Claims, 10 Drawing Sheets

(56) References Cited

U.S. PATENT DOCUMENTS

| | | | | | |
|---|---|---|---|---|---|
| 5,253,471 | A | * | 10/1993 | Richardson | F23R 3/002 |
| | | | | | 60/754 |
| 5,351,477 | A | * | 10/1994 | Joshi | F23D 17/002 |
| | | | | | 60/737 |
| 5,408,825 | A | | 4/1995 | Foss et al. | |
| 5,451,160 | A | * | 9/1995 | Becker | F23R 3/14 |
| | | | | | 431/284 |
| 5,590,529 | A | | 1/1997 | Joshi et al. | |
| 6,068,470 | A | * | 5/2000 | Zarzalis | F23D 11/007 |
| | | | | | 239/428 |
| 6,141,967 | A | * | 11/2000 | Angel | F23R 3/14 |
| | | | | | 60/737 |
| 6,317,680 | B1 | | 11/2001 | Luttrell et al. | |
| 6,381,964 | B1 | * | 5/2002 | Pritchard, Jr. | F23R 3/14 |
| | | | | | 60/746 |
| 6,546,732 | B1 | * | 4/2003 | Young | F23D 14/78 |
| | | | | | 60/740 |
| 7,343,745 | B2 | | 3/2008 | Inoue et al. | |
| 7,669,421 | B2 | | 3/2010 | Saitoh et al. | |
| 8,297,057 | B2 | | 10/2012 | Toon | |
| 8,365,531 | B2 | | 2/2013 | Pidcock et al. | |
| 8,387,391 | B2 | | 3/2013 | Patel et al. | |
| 8,701,416 | B2 | | 4/2014 | Teets | |
| 9,291,098 | B2 | | 3/2016 | Chen et al. | |
| 10,393,030 | B2 | | 8/2019 | Proscia | |
| 10,458,331 | B2 | | 10/2019 | Xu | |
| 10,494,928 | B2 | * | 12/2019 | Harding | F23R 3/005 |
| 10,794,596 | B2 | | 10/2020 | Dai et al. | |
| 10,859,271 | B2 | * | 12/2020 | Rimmer | F23R 3/002 |
| 11,175,044 | B2 | | 11/2021 | Jette et al. | |
| 11,175,045 | B2 | | 11/2021 | Benjamin et al. | |
| 11,506,390 | B2 | | 11/2022 | Sayder | |
| 11,526,403 | B1 | | 12/2022 | Ruslyakov et al. | |
| 2002/0092302 | A1 | * | 7/2002 | Johnson | F23C 99/00 |
| | | | | | 60/737 |
| 2002/0162333 | A1 | * | 11/2002 | Zelina | F23R 3/286 |
| | | | | | 60/737 |
| 2004/0065090 | A1 | * | 4/2004 | Al-Roub | F23R 3/14 |
| | | | | | 60/776 |
| 2005/0130089 | A1 | * | 6/2005 | Oda | F23R 3/286 |
| | | | | | 431/183 |
| 2006/0107667 | A1 | | 5/2006 | Haynes et al. | |
| 2007/0003897 | A1 | | 1/2007 | Koizumi et al. | |
| 2007/0137207 | A1 | * | 6/2007 | Mancini | F23R 3/343 |
| | | | | | 60/737 |

| | | | | | |
|---|---|---|---|---|---|
| 2008/0168773 | A1 | * | 7/2008 | Sandelis | F23R 3/14 |
| | | | | | 60/748 |
| 2008/0236165 | A1 | * | 10/2008 | Baudoin | F23R 3/343 |
| | | | | | 60/746 |
| 2008/0302105 | A1 | * | 12/2008 | Oda | F23R 3/28 |
| | | | | | 60/737 |
| 2010/0308135 | A1 | * | 12/2010 | Yamamoto | F23R 3/343 |
| | | | | | 239/402 |
| 2011/0089264 | A1 | * | 4/2011 | Thomson | F23R 3/14 |
| | | | | | 239/518 |
| 2012/0192542 | A1 | * | 8/2012 | Chillar | F02C 9/40 |
| | | | | | 60/39.463 |
| 2015/0082797 | A1 | * | 3/2015 | Matsuyama | F23R 3/16 |
| | | | | | 60/746 |
| 2015/0159874 | A1 | | 6/2015 | Toon et al. | |
| 2017/0138268 | A1 | * | 5/2017 | Nakahara | F23D 17/00 |
| 2017/0299183 | A1 | | 10/2017 | Bagchi et al. | |
| 2019/0170355 | A1 | * | 6/2019 | Tentorio | F23R 3/286 |
| 2020/0025386 | A1 | * | 1/2020 | Muldal | F23R 3/343 |
| 2020/0378603 | A1 | * | 12/2020 | Tentorio | F23R 3/286 |
| 2022/0268213 | A1 | | 8/2022 | Morenko et al. | |
| 2023/0204213 | A1 | | 6/2023 | Naik et al. | |
| 2023/0220802 | A1 | | 7/2023 | Bucaro et al. | |
| 2023/0340915 | A1 | | 10/2023 | Speak et al. | |
| 2024/0019123 | A1 | | 1/2024 | D'Agostini et al. | |
| 2024/0133553 | A1 | * | 4/2024 | Naik | F23R 3/10 |
| 2024/0280260 | A1 | * | 8/2024 | Tsumura | F23D 14/58 |

FOREIGN PATENT DOCUMENTS

| | | | |
|---|---|---|---|
| DE | 102022201182 | A1 | 8/2023 |
| EP | 2241816 | A2 | 10/2010 |
| EP | 1193449 | B1 | 3/2011 |
| FR | 3133890 | A1 | 9/2023 |
| WO | 2014/026719 | A1 | 2/2014 |
| WO | 2023/214129 | A1 | 11/2023 |

OTHER PUBLICATIONS

U.S. Appl. No. 18/477,597, filed Sep. 29, 2023.
U.S. Appl. No. 18/326,639, filed May 31, 2023.
U.S. Appl. No. 18/326,669, filed May 31, 2023.
U.S. Appl. No. 18/326,647, filed May 31, 2023.
U.S. Appl. No. 18/326,665, filed May 31, 2023.

* cited by examiner

GAS TURBINE ENGINE, FUEL NOZZLE ASSEMBLY, AND METHOD

TECHNICAL FIELD

The present subject matter relates generally to a gas turbine engine having a fuel nozzle assembly.

BACKGROUND

Turbine engines are driven by a flow of combustion gases passing through the engine to rotate a multitude of turbine blades, which, in turn, rotate a compressor to provide compressed air to the combustor for combustion. A combustor can be provided within the turbine engine and is fluidly coupled with a turbine into which the combusted gases flow.

Historically, hydrocarbon fuels are used in the combustor of a turbine engine. Generally, air and fuel are fed to a combustion chamber, the air and fuel are mixed, and then the fuel is burned in the presence of the air to produce hot gas. The hot gas is then fed to a turbine where it cools and expands to produce power. By-products of the fuel combustion typically include environmentally unwanted byproducts, such as nitrogen oxide and nitrogen dioxide (collectively called NOx), carbon monoxide (CO), unburned hydrocarbons (UHC) (e.g., methane and volatile organic compounds that contribute to the formation of atmospheric ozone), and other oxides, including oxides of sulfur (e.g., $SO_2$ and $SO_3$).

To reduce the environmentally unwanted byproducts, other fuels, such as hydrogen, are being explored. Hydrogen or hydrogen mixed with another element has a higher flame temperature than traditional hydrocarbon fuels. That is, hydrogen or a hydrogen mixed fuel typically has a wider flammable range and a faster burning velocity than traditional hydrocarbon-based fuels.

DETAILED DESCRIPTION

Figure 1:
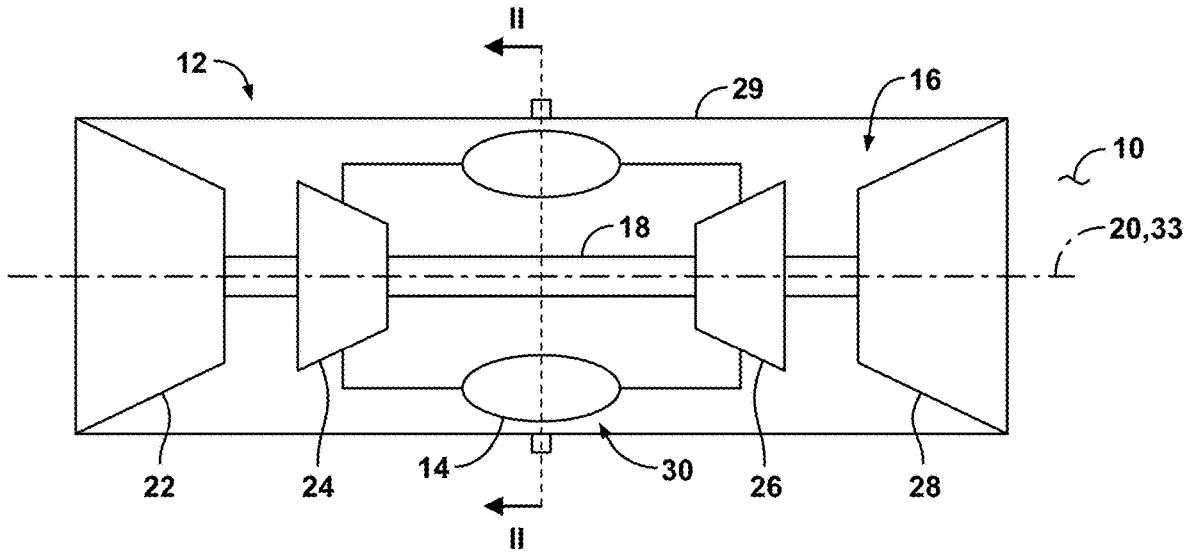
FIG. 1 is a schematic view of a gas turbine engine having a compression section, a combustion section, and a turbine section in accordance with various aspects described herein.

Aspects of the disclosure described herein are directed to a combustor. With some aspects, the disclosed combustors and fuel nozzle assemblies can be utilized with gaseous fuel, such as hydrogen. Gaseous fuel, including hydrogen, spreads/disperses at a faster rate than atomized liquid fuel, which can involve less mixing time for the gaseous fuel, fuel mixing tube lengths can be shorter, and the flame from the gaseous fuel may be more likely to spread farther and faster, which can increase the risk of flashback and flameholding (e.g., in a nozzle or mixer), and increase the impact of controlling the flame and limiting flame spread by controlling the dispersion of the gaseous fuel.

Many other possible aspects and configurations in addition to those shown in the included figures are contemplated by the present disclosure. The disclosed fuel nozzles can be utilized efficiently with multiple fuels, such as liquid fuel (e.g., Jet-A) and gaseous fuel (e.g., hydrogen gas). The fuels can be emitted by the fuel nozzles at the same time or at separate times. The disclosed fuel nozzles can provide greater flame stability, lower flame temperatures, reduced flashback, reduced flameholding, and lower NOx emissions relative to other designs. Distributed fuel injection from the disclosed fuel nozzles, such as radially distributed fuel injection, axially distributed fuel injection, or both, can promote combustion stability, lower NOx emissions, and increased durability. Limiting flashback and flameholding can allow for use of more reactive fuels, such as hydrogen, facilitate the use of more reactive fuels by limiting wear to engine components, or both. Increased mixing times can provide more uniform temperature distribution and lower maximum temperatures, which can limit NOx emissions.

Utilizing only hydrogen fuel during certain phases of a flight, such as approach, can limit coking by purging unburnt liquid fuel from the combustion section. Utilizing only hydrogen fuel during certain phases of a flight, such as cruise and approach, can result in zero carbon emissions (e.g., zero carbon dioxide). Utilizing hydrogen fuel can reduce the length of the combustor by reducing mixing times, as hydrogen fuel intermixes faster with air than traditional fuels like Jet-A. Utilizing only hydrogen fuel at low power can limit or prevent smoke. Utilizing traditional fuels, such as liquid Jet-A fuel, during at least some phases of a flight, such as take-off and climb, can limit temperatures to improve durability and limit NOx emissions.

For purposes of illustration, the present disclosure will be described with respect to a turbine engine. It will be understood, however, that aspects of the disclosure described herein are not so limited. A combustor as described herein can be implemented in various engines, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

With the combustors and fuel nozzle assemblies described herein, gaseous hydrogen fuel can be used without the need of diluents. In some embodiments, no diluent is added to the combustion chamber and the fuel is substantially completely diatomic hydrogen without diluent. As used herein, the term "substantially completely," is used to describe the amount of a particular element or molecule (e.g., diatomic hydrogen), refers to at least 99% by mass of the described portion of the element or molecule, such as at least 97.5%, such as at least 95%, such as at least 92.5%, such as at least 90%, such as at least 85%, or such as at least 75% by mass of the described portion of the element or molecule. In some examples, the fuel is entirely (e.g., 100%) hydrogen by mass.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The terms like "first", "second", etc. may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluidly coupled" means that a fluid is capable of making the connection between the areas specified.

The term "nozzle" has been used in various ways in the context of gas turbine engines. In the instant application, "nozzle" refers to a component having a portion for fluid coupling to a fuel supply and having at least one portion for fluidly coupling with a combustor portion, a combustor liner, a combustion chamber, or combinations thereof.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only, and the dimensions, positions, order, and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Uses of "and" and "or" are to be construed broadly. For example, and without limitation, uses of "and" do not necessarily require all elements or features listed, and uses of "or" are inclusive unless such a construction would be illogical.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and systems. In at least some instances, the approximating language may correspond to the precision of an instrument for measuring the value, or the precision of the methods or machines for constructing or manufacturing the components and systems. For example, the approximating language may refer to being within a 1, 2, 4, 5, 10, 15, or 20 percent margin in either individual values, range(s) of values and endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

"Proximate" as used herein is a descriptor for locating parts described herein. Further, the term "proximate" means nearer or closer to the part recited than the following part. For example, a first aperture proximate a wall, the first aperture located upstream from a second aperture means that the first aperture is closer to the wall than the first aperture is to the second aperture.

Additionally, as used herein, a "controller" can include a component configured or adapted to provide instruction, control, operation, or any form of communication for operable components to effect the operation thereof. A controller can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), proportional resonant controller (PR), a hardware-accelerated logic controller (e.g. for encoding, decoding, transcoding, etc.), the like, or a combination thereof. Non-limiting examples of a controller can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller can also include a data storage component accessible by the processor, including memory, whether transient, volatile or non-transient, or non-volatile memory.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein. In another non-limiting example, a controller can be configured for comparing a first value with a second value and operating and controlling operations of additional components based on the satisfying of that comparison. For example, when a sensed, measured, or provided value is compared with another value, including a stored or predetermined value, the satisfaction of that comparison can result in actions, functions, or operations controllable by the controller.

FIG. 1 is a schematic view of a gas turbine engine 10. As a non-limiting example, the gas turbine engine 10 can be used within an aircraft. The gas turbine engine 10 can include, at least, a compressor section 12, a combustion section 14, and a turbine section 16 in a serial flow arrangement. A drive shaft 18 rotationally couples the compressor section 12 and turbine section 16, such that rotation of one affects the rotation of the other and defines a rotational axis 20 for the gas turbine engine 10.

The compressor section 12 can include a low-pressure (LP) compressor 22, and a high-pressure (HP) compressor 24 serially fluidly coupled to one another. The turbine section 16 can include an HP turbine 26, and an LP turbine 28 serially fluidly coupled to one another. The drive shaft 18 can operatively couple the LP compressor 22, the HP compressor 24, the HP turbine 26 and the LP turbine 28 together. Alternatively, the drive shaft 18 can include an LP drive shaft and an HP drive shaft. The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a shroud or casing, which can extend circumferentially about and enshroud one or more sections of the gas turbine engine 10. It will be appreciated that the representation of the compressor section 12 is merely schematic and that there can be any number of blades, vanes and stages. Further, it is contemplated that there can be any number of other components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section 16 can be mounted to the shroud or casing in a circumferential manner. It is noted that there can be any number of blades, vanes and turbine stages as the illustrated turbine section 16 is merely a schematic representation. Further, it is contemplated that there can be any number of other components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14. The combustion section 14 can include a combustor 30.

During operation of the gas turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the gas turbine engine 10 via an exhaust section (not illustrated) downstream of the turbine section 16. The driving of the LP turbine 28 drives the LP spool to rotate the fan (not illustrated) and the LP compressor 22. The pressurized airflow and the combustion gases can together define a working airflow that flows through the fan, compressor section 12, combustion section 14, and turbine section 16 of the gas turbine engine 10.

Figure 2:
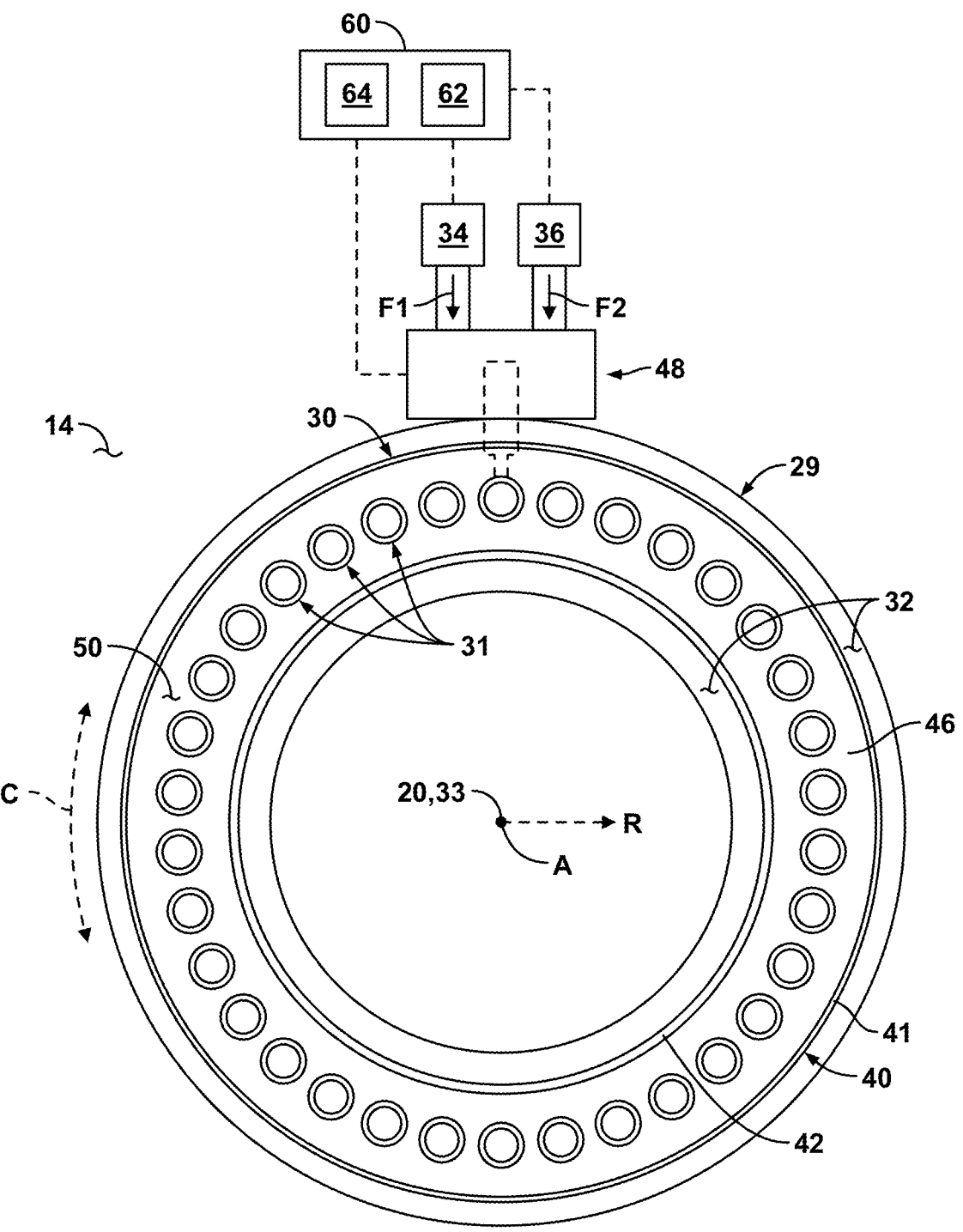
FIG. 2 is a schematic view of the combustion section of FIG. 1 along line II-II in accordance with various aspects described herein.

FIG. 2 depicts a cross-sectional view of the combustion section 14 along line II-II of FIG. 1. The combustion section 14 can include the combustor 30 with an annular arrangement of combustor portions 31 disposed around the centerline or rotational axis 20 of the gas turbine engine 10 (e.g., circumferentially spaced from each other in an annular configuration) (FIG. 1). The combustor portions 31 can, in some configurations, include or be configured as combustor cups, fuel cups, or nozzle cups. The combustor portions 31 can be arranged in an annular configuration about the rotational axis 20. A fuel nozzle assembly 48 can be connected to each combustor portion 31. The combustor 30 can have a can, can-annular, or annular arrangement depending on the type of engine in which the combustor 30 is located.

In a non-limiting example, the combustor 30 can have a combination arrangement located with a shroud or casing 29 of the gas turbine engine 10 (FIG. 1). The shroud or casing 29 can enshroud or cover at least a portion of the combustion section 14.

The combustor 30 can be at least partially defined by a combustor liner 40. In some examples, the combustor liner 40 can include an outer liner 41 and an inner liner 42 concentric with respect to each other and arranged in an annular fashion about the engine centerline or rotational axis 20. In some examples, the combustor liner 40 can have an annular structure at least partially defining the combustor 30. In some examples, the combustor liner 40 can include multiple segments or portions collectively forming the combustor liner 40. In some examples, the combustor liner 40 can include multiple segments or portions collectively forming the combustor liner 40. In some examples, the combustor liner 40 can include the outer liner 41 radially spaced from the inner liner 42. In some examples, the combustor liner 40 can include a single liner. The combustor portions 31 can be disposed at a radial distance from the rotational axis 20 that is greater than a radial distance of the inner liner 42 and less than a radial distance of the outer liner 41. A combustion section centerline 33 of the combustion section 14 can be colinear with the rotational axis 20. The combustion section centerline 33 can define a radial direction R, an axial direction A, and a circumferential direction C.

The combustor liner 40 can at least partially define a combustion chamber 50 arranged annularly about the rotational axis 20. For example, a wall 46 (e.g., a dome wall) may be substantially perpendicular to the rotational axis 20 and can extend to the outer liner 41, the inner liner 42, or both, to at least partially define the combustion chamber 50. A compressed air passage 32 can be defined at least in part by both the combustor liner 40 and the casing 29.

The combustor 30 can include or be fluidly coupled to a first fuel supply 34 (e.g., a first fuel manifold or conduit) that supplies a first fuel F1, a second fuel supply 36 (e.g., a second fuel manifold or circuit) that supplies a second fuel F2, or both. For example, the fuel nozzle assembly 48 can include or be fluidly coupled with the first fuel supply 34 and the second fuel supply 36. The fuel nozzle assembly 48 fluidly couples the first fuel supply 34 and the second fuel supply 36 with one of the combustor portions 31 and the combustion chamber 50, such as to provide the first fuel F1, the second fuel F2, or both to the combustion chamber 50. The fuel nozzle assembly 48 can be coupled to the wall 46. The first fuel F1 and the second fuel F2 can include any suitable fuel, including liquid fuel, such as Jet-A, or gaseous fuel, such as hydrogen fuel, in non-limiting examples, which can include 100% H$_2$ (e.g., without diluents). In some examples, the first fuel F1 can include liquid fuel (e.g., atomized liquid fuel, such as Jet-A) or a gaseous fuel, such as methane, which can be provided in the form of natural gas, and the second fuel F2 can include gaseous fuel, such as hydrogen gas. For example, the fuel nozzle assembly 48 can be a multi-fuel nozzle assembly, a liquid and gaseous fuel nozzle assembly, or a liquid and gaseous hydrogen fuel nozzle assembly. Additionally or alternatively, the first fuel supply 34 can be a liquid fuel supply and the second fuel supply 36 can be a gaseous hydrogen fuel supply. A controller 60 can be connected to and at least partially control operation of the first fuel supply 34, the second fuel supply 36, the fuel nozzle assembly 48, or combinations thereof. The controller 60 can include a processor 62 and a memory 64.

Figure 3:
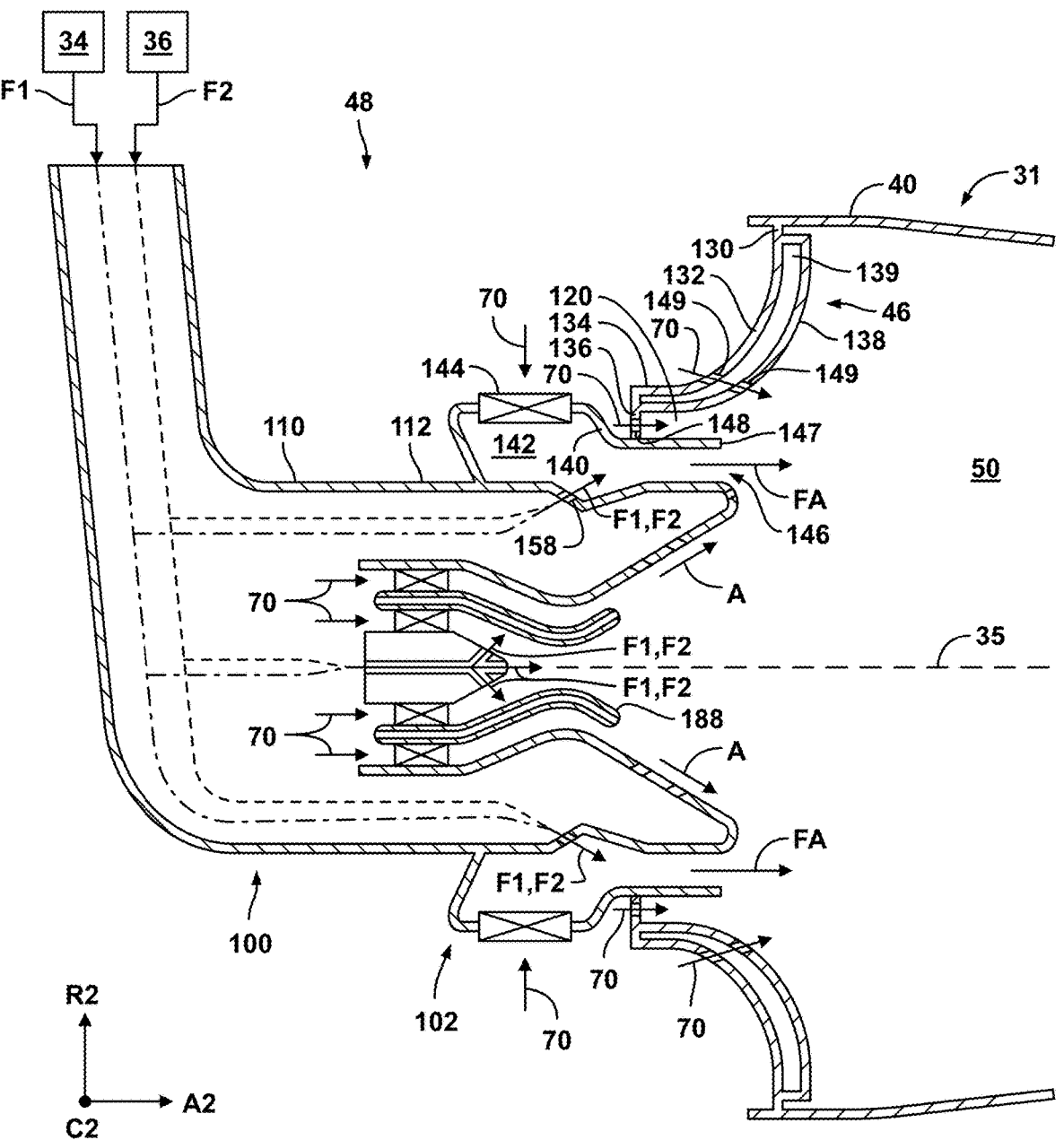
FIG. 3 is a schematic cross-sectional view illustrating portions of a fuel nozzle assembly coupled to a combustion chamber in accordance with various aspects described herein.

FIG. 3 is a cross-sectional schematic view of an example of one of the combustor portions 31, which can be provided, at least in part, by the fuel nozzle assembly 48. The fuel nozzle assembly 48 can be coupled, directly or indirectly, to the wall 46 and the combustor liner 40. The fuel nozzle assembly 48 can include a fuel nozzle assembly centerline 35 that can be parallel with and radially offset from the combustion section centerline 33 (FIG. 2). The fuel nozzle assembly centerline 35 can be colinear with a centerline of the combustor portion 31 to which the fuel nozzle assembly 48 is coupled or part of. The fuel nozzle assembly centerline 35 can define a second radial direction R2, a second axial direction A2, and a second circumferential direction C2. The second axial direction A2 can be parallel to the axial direction A (FIG. 2).

The fuel nozzle assembly 48 includes a fuel nozzle 100 and a main mixer 102 (e.g., a fuel-air mixer) that provide fuel, such as at least one of the first fuel F1 or the second fuel F2, and air 70 to the combustion chamber 50. The fuel nozzle 100 is disposed such that the main mixer 102 is disposed at least partially around the fuel nozzle 100. For example, the fuel nozzle 100 includes an outer wall 110 and the main mixer 102 is coupled to an outer surface 112 of the outer wall 110 such that the main mixer 102 at least partially circumscribes the fuel nozzle 100. The main mixer 102 is coupled to the wall 46, which can couple the fuel nozzle assembly 48 to the wall 46 and the combustor liner 40.

The main mixer 102 can be coupled to the wall 46 such that a cavity 120 (e.g. an annular cavity) is formed between the wall 46 and the main mixer 102. The wall 46 can include a first radial portion 130 coupled to the combustor liner 40 and extending radially inward in the second radial direction R2, a curved portion 132 that extends radially inward and forward from the first radial portion 130, an axial portion 134 that extends forward from the curved portion 132, and a second radial portion 136 that extends radially inward from a forward end of the axial portion 134. The main mixer 102 includes a main mixer wall 140, at least a portion of which extends in the second axial direction A2 and is disposed radially inward of the axial portion 134. For example, the outer wall 110 and the main mixer wall 140 can at least partially define a main mixing chamber 142 that can have an annular configuration circumscribing the fuel nozzle 100. The main mixer 102 can include a main swirler 144 (e.g., a main mixer swirler) coupled to the main mixer wall 140 to emit swirled air 70 into the main mixing chamber 142. For example, the main swirler 144 can include a radial swirler configured to receive air 70 moving radially inward and output swirled air 70 radially inward, such as toward the outer surface 112 of the outer wall 110. The main mixing chamber 142 can receive the swirled air 70 from the main swirler 144 and fuel, such as one or both of the first fuel F1 or the second fuel F2, from the fuel nozzle 100, and the air 70 and fuel can mix in the main mixing chamber 142 to form a main fuel-air mixture FA that is emitted from an outlet 146 of the main mixer 102 into the combustion chamber 50. The outlet 146 can be defined between the main mixer wall 140 and the outer wall 110 at a trailing edge 147 of the main mixer wall 140.

The main mixer wall 140, the axial portion 134, and the second radial portion 136 at least partially define the cavity 120. The wall 46 can include one or more flame shaping apertures, such as a first flame shaping aperture 148 and a second flame shaping aperture 149. The first flame shaping aperture 148 can be disposed in the second radial portion 136 to emit air 70 into the cavity 120, such as aft in the second axial direction A2. The second flame shaping aperture 149 can be disposed in the curved portion 132 to emit air 70 into the combustion chamber 50 in a direction that is both aft and radially inward, relative to the fuel nozzle assembly centerline 35. The first flame shaping aperture 148 can be forward of the second flame shaping aperture 149, the outlet 146 of the main mixer 102, or both. Additionally or alternatively, the first flame shaping aperture 148 can be radially inward of the second flame shaping aperture 149, radially outward of the outlet 146, aft of an outer wall fuel orifice 158 of the outer wall 110, or a combination thereof. The second flame shaping aperture 149 can be aft of the outlet 146, the outer wall fuel orifice 158, or both. The first and second flame shaping apertures 148, 149 can emit air 70 that can facilitate shaping of flames in the combustion chamber 50. For example, air 70 from one or both of the first and second flame shaping apertures 148, 149 can facilitate moving flames aft of the wall 46 and radially inward of the combustor liner 40, which can limit temperatures at the wall 46 and at the combustor liner 40, and limiting flashback and flameholding. With some examples, the wall 46 can include a dual-wall configuration, such as at the curved portion 132, and the second flame shaping aperture 149 can extend completely through the dual-wall configuration. The dual-wall configuration can include the curved portion 132 and a second curved portion 138 spaced from the curved portion 132 and extending between the first radial portion 130 and the second radial portion 136. A wall cavity 139 can be defined between the curved portion 132 and the second curved portion 138 The first flame shaping aperture 148 and the second flame shaping aperture 149 can be single apertures (e.g., annular apertures) or can include a plurality of apertures, such as a plurality of circumferentially spaced apertures, or rows or columns thereof.

Figure 4:
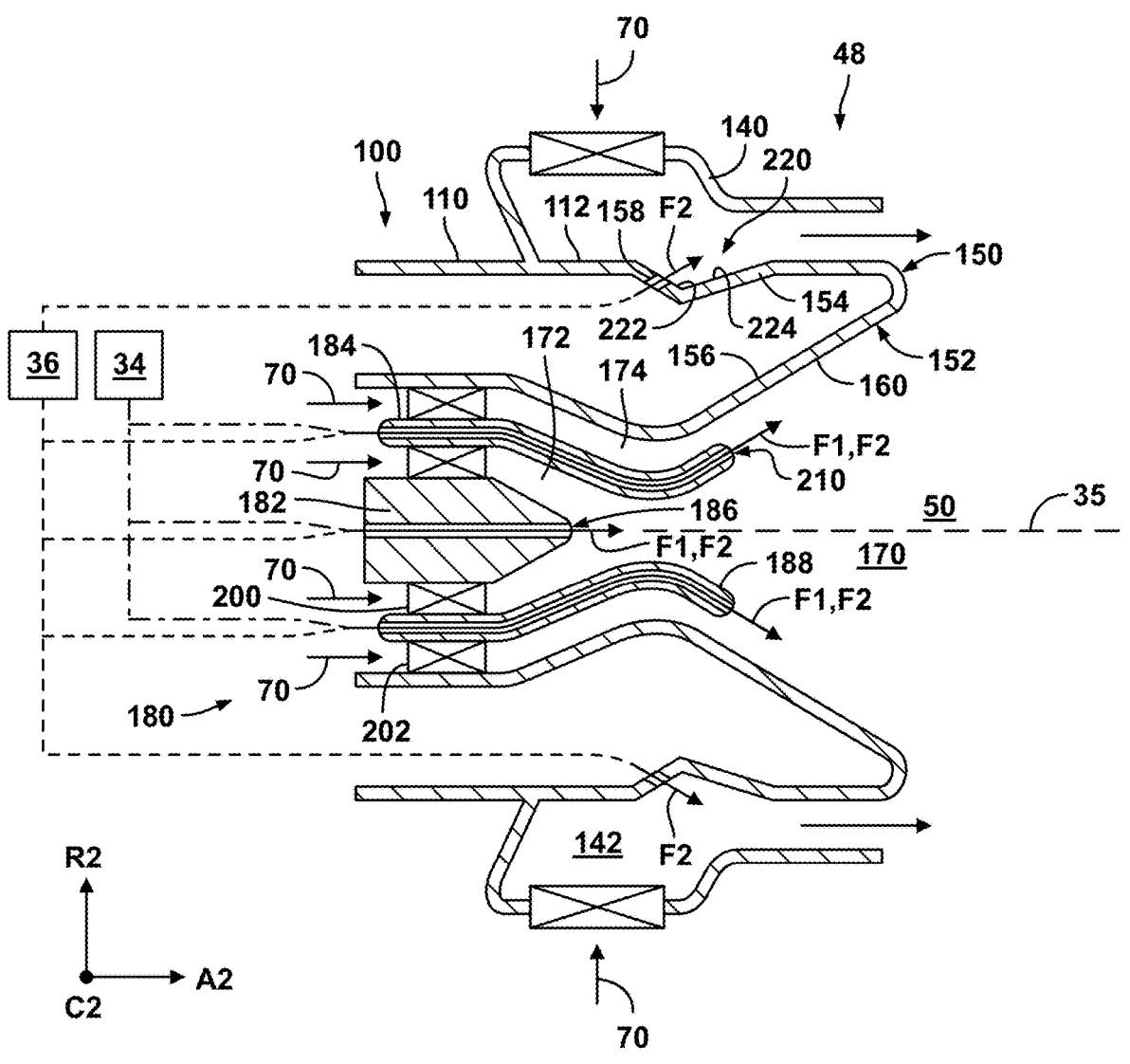
FIG. 4 is a schematic cross-sectional view illustrating portions of a fuel nozzle assembly in accordance with various aspects described herein.
Figure 5:
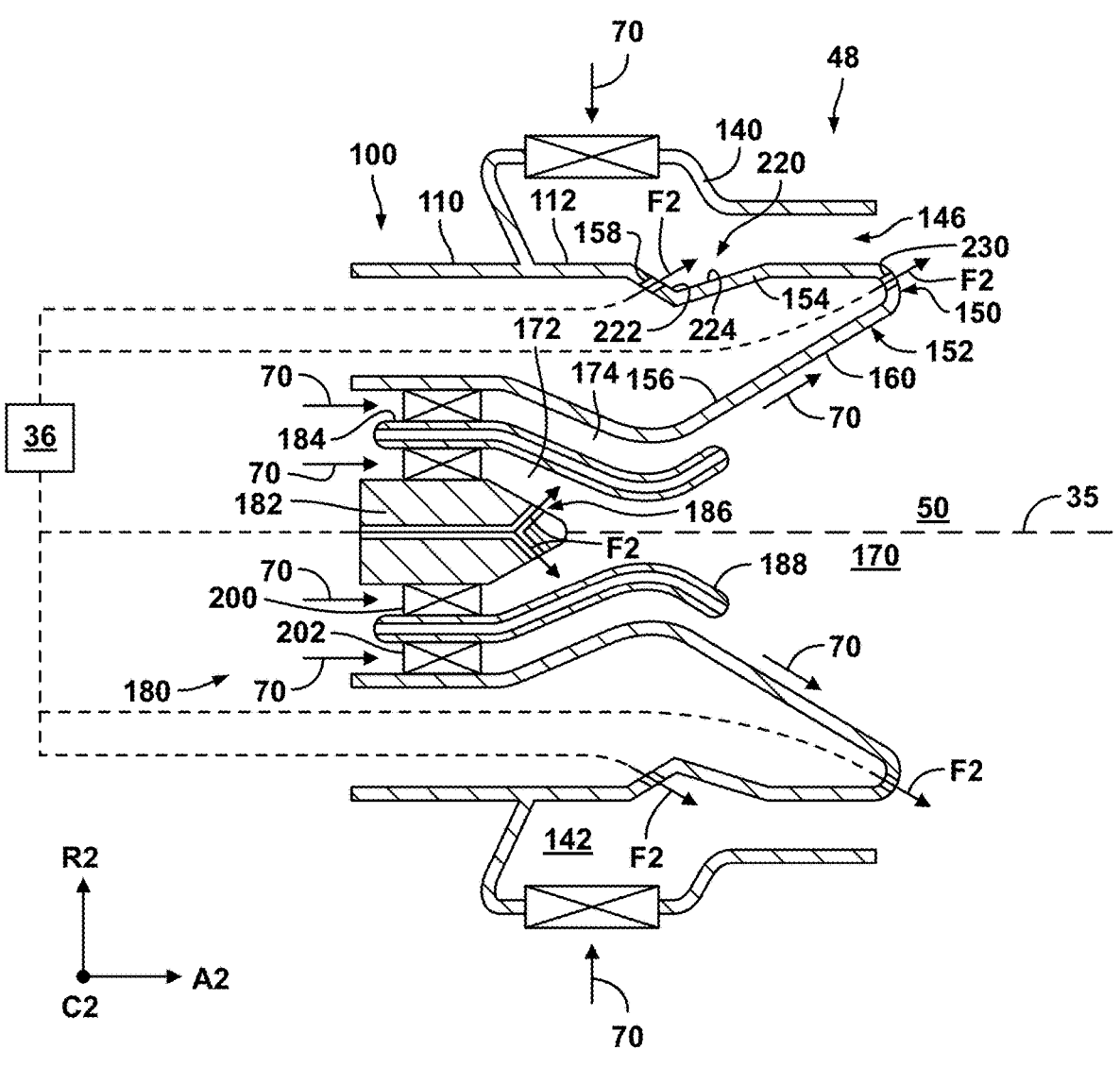
FIG. 5 is a schematic cross-sectional view illustrating portions of a fuel nozzle assembly in accordance with various aspects described herein.
Figure 6:
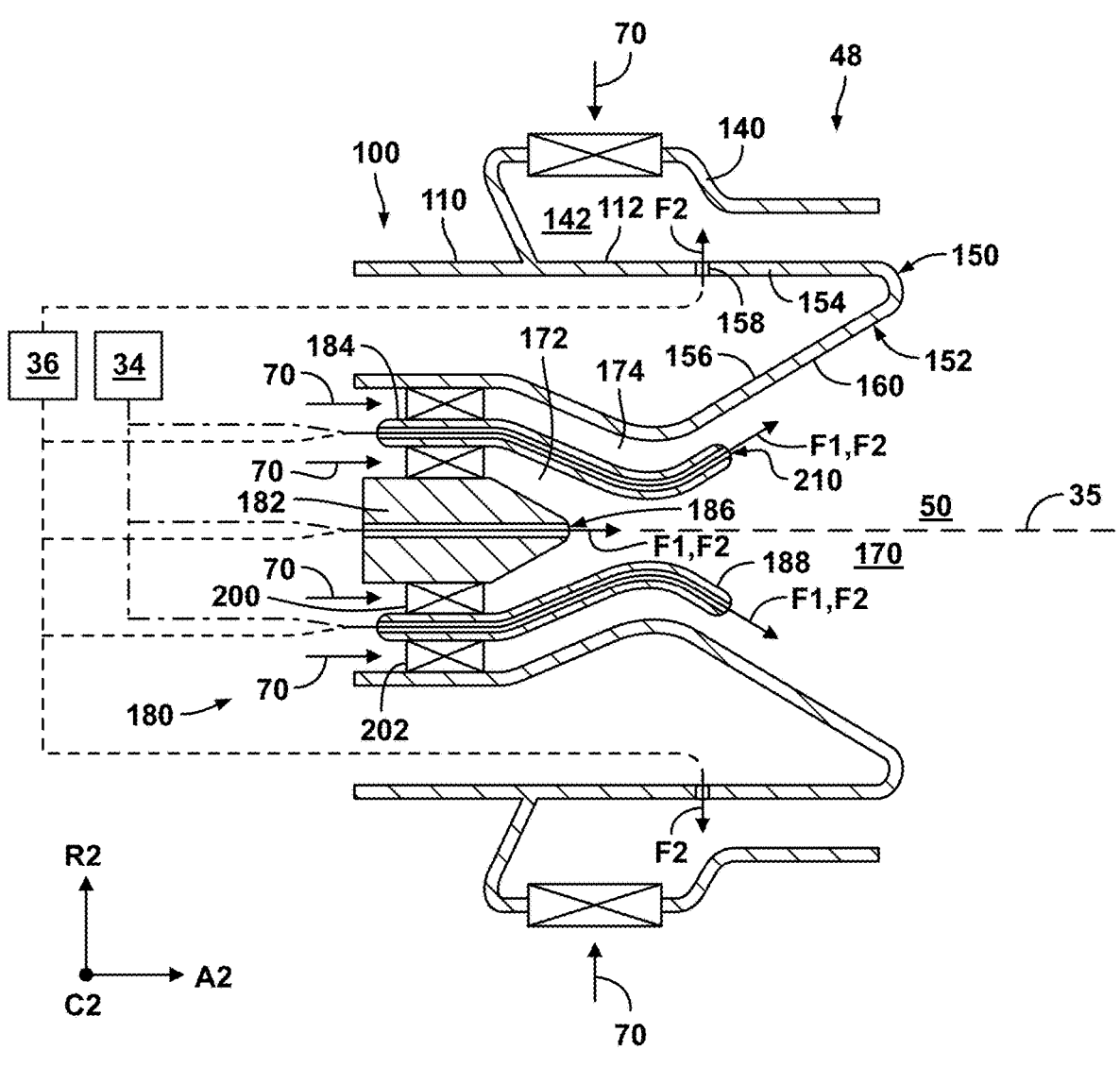
FIG. 6 is a schematic cross-sectional view illustrating portions of a fuel nozzle assembly in accordance with various aspects described herein.

Referring to FIGS. 4-6, the outer wall 110 of the fuel nozzle 100 of the fuel nozzle assembly 48 can include a trailing edge 150 and can be shaped to define a pilot cone 152. For example, the pilot cone 152 can include an outer portion 154 and an inner portion 156 of the outer wall 110 provided in a V-shaped configuration that opens forward. The outer portion 154 can provide the outer surface 112 and include the outer wall fuel orifice 158. In the examples shown in FIGS. 4-6, the outer wall fuel orifice 158 is shown as fluidly coupled with the second fuel supply 36, but the outer wall fuel orifice 158 can, additionally or alternatively, be fluidly coupled with the first fuel supply 34 (FIGS. 4 and 6). The outer wall fuel orifice 158 can be radially oriented to emit fuel, such as at least one of the first fuel F1 or the second fuel F2, radially outward toward the main mixer wall 140 and into the main mixing chamber 142. The outer wall fuel orifice 158 can be directly radially oriented (e.g., to emit fuel directly in the second radial direction R2) or can be partially radially oriented (e.g., angled relative to the second radial direction R2 to emit fuel radially outward and aft). The outer wall fuel orifice 158 can include a single orifice (e.g., an annular orifice) or a plurality of orifices, such as a plurality of circumferentially spaced orifices. The inner portion 156 can provide a conical surface 160 that diverges toward the combustion chamber 50 to meet the outer portion 154. Fluidly coupling fuel orifices, such as the outer wall fuel orifices 158, with both of the first and second fuel supplies 34, 36 can allow the fuel nozzle assembly 48 to operate in a plurality of modes, such as to emit the first fuel F1 or the second fuel F2 from different locations during different operational conditions (e.g., flight conditions). Emitting fuel radially outward can facilitate more even distributions of fuel in the combustion chamber 50, which can limit NOx emissions.

The outer wall 110 (e.g., the inner portion 156) can at least partially define a pilot channel 170. The fuel nozzle 100 can include a secondary mixer 180 disposed at least partially in the pilot channel 170 that is fluidly coupled with the combustion chamber 50 (e.g., directly). The secondary mixer 180 can include a pilot body 182 and a pilot splitter 184. The pilot body 182 can be centered with the fuel nozzle assembly centerline 35. The pilot splitter 184 can be disposed, at least in part, radially between the pilot body 182 and the outer wall 110 to split the pilot channel 170 into a first pilot channel section 172 between the pilot body 182 and the pilot splitter 184, and a second pilot channel section 174 between the pilot splitter 184 and the inner portion 156 of the outer wall 110.

The pilot body 182 can include a pilot fuel orifice 186 that can be fluidly coupled with the first fuel supply 34 and the second fuel supply 36. The pilot fuel orifice 186 can be axially oriented to emit fuel in the second axial direction A2 (FIGS. 4 and 6) or can have an orientation with a radial component (FIG. 5), such that the pilot fuel orifice 186 emits fuel, such as at least one of the first fuel F1 or the second fuel F2, in a direction offset from the second axial direction A2 and the second radial direction R2 and into the pilot channel 170. With the radially oriented configuration (FIG. 5), the pilot fuel orifice 186 can emit fuel toward the pilot splitter 184, such as in cross-flow with air 70 flowing through the first pilot channel section 172. Such cross-flow can facilitate mixing of fuel and air 70, which can limit temperatures and NOx emissions. The pilot fuel orifice 186 can include a single fuel orifice (e.g., an axially oriented central orifice or a radially oriented annular orifice) or a plurality of orifices that can include one or more axially oriented orifices, one or more radially oriented orifices, or a combination thereof. The pilot fuel orifice 186 can be fluidly coupled with the first fuel supply 34, the second fuel supply 36, or both. The pilot splitter 184 can include a converging-diverging configuration and can extend axially aft of the pilot body 182. The trailing edge 150 can be aft of an aft end of the pilot splitter 184.

Fluidly coupling fuel orifices, such as the outer wall fuel orifice 158, the pilot fuel orifice 186, or a combination thereof, with both of the first and second fuel supplies 34, 36 can allow the fuel nozzle assembly 48 to operate in a plurality of modes, such as to emit the first fuel F1 or the second fuel F2 from different locations during different operational conditions (e.g., flight conditions). Emitting fuel radially outward can facilitate more even distributions of fuel in the combustion chamber 50, which can limit NOx emissions.

The secondary mixer 180 can include a first pilot swirler 200, a second pilot swirler 202, or both. The first pilot swirler 200 can be disposed in the pilot channel 170 at least partially between the pilot body 182 and the pilot splitter 184. The second pilot swirler 202 can be disposed in the pilot channel 170 at least partially between the pilot splitter 184 and the outer wall 110 (e.g., the inner portion 156). The first and second pilot swirlers 200, 202 can be axial swirlers that receive air 70 moving in the second axial direction A2 and output swirled air 70 into the pilot channel 170 in the second axial direction A2. The pilot splitter 184 can include a splitter fuel orifice 210 (FIGS. 4 and 6) that can be disposed at a trailing edge 188 of the pilot splitter 184 and can be oriented with a radial component (e.g., radially oriented). For example, the trailing edge of the pilot splitter 184 can be angled radially outward, at least to some extent, such that the first or second fuel F1, F2 emitted from the splitter fuel orifice 210 is directed radially outward and axially aft. The splitter fuel orifice 210 (FIGS. 4 and 6) can be fluidly coupled with the first fuel supply 34, the second fuel supply 36, or both to emit the first fuel F1, the second fuel F2, or both into the pilot channel 170, toward the combustion chamber 50, or both. The splitter fuel orifice 210 (FIGS. 4 and 6) can include an annular orifice or a plurality of circumferentially spaced orifices.

Referring to FIGS. 4 and 5, the outer wall 110 can define a recess 220 (e.g., a radial recess). For example, the outer wall 110 can include a first angled surface 222 and a second angled surface 224 disposed in a V-shaped configuration that opens radially outward. The first angled surface 222 can be angled such that the first angled surface 222 faces radially outward and aft. The second angled surface 224 can be angled such that the second angled surface 224 faces radially outward and forward. The outer wall fuel orifice 158 can be disposed at the first angled surface 222 such that the outer wall fuel orifice 158 is partially radially oriented to emit the first fuel F1, the second fuel F2, or both, radially outward and aft (e.g., to emit fuel radially outward and forward). In some examples, the outer wall fuel orifice 158 can be provided on the second angled surface 224, or both of the first and second angled surfaces 222, 224.

Referring to FIG. 5, the outer wall 110 can include a trailing edge fuel orifice 230 disposed at the trailing edge 150. The trailing edge fuel orifice 230 can be axially oriented or at least partially radially oriented and emit fuel, such as the second fuel F2, into the combustion chamber 50. The trailing edge fuel orifice 230 is aft of the outer wall fuel orifice 158, which is aft of the pilot fuel orifice 186, which provides an axially staged configuration of fuel injection. Such an axially staged configuration can provide different mixing lengths and times for fuel and air 70, which can provide greater flame stability (e.g., via shorter mixing lengths and times) and lower temperatures and NOx emissions (e.g., via longer mixing lengths and times).

Referring to FIG. 6, the outer wall fuel orifice 158 can be aligned with the second radial direction (R2) (e.g., directly radially oriented) and fluidly coupled with the second fuel supply 36 to emit the second fuel F2 into the main mixing chamber 142. In some examples, the outer wall fuel orifice 158 can, additionally or alternatively, be fluidly coupled with the first fuel supply 34 to emit the first fuel F1 into the main mixing chamber 142.

Figure 7:
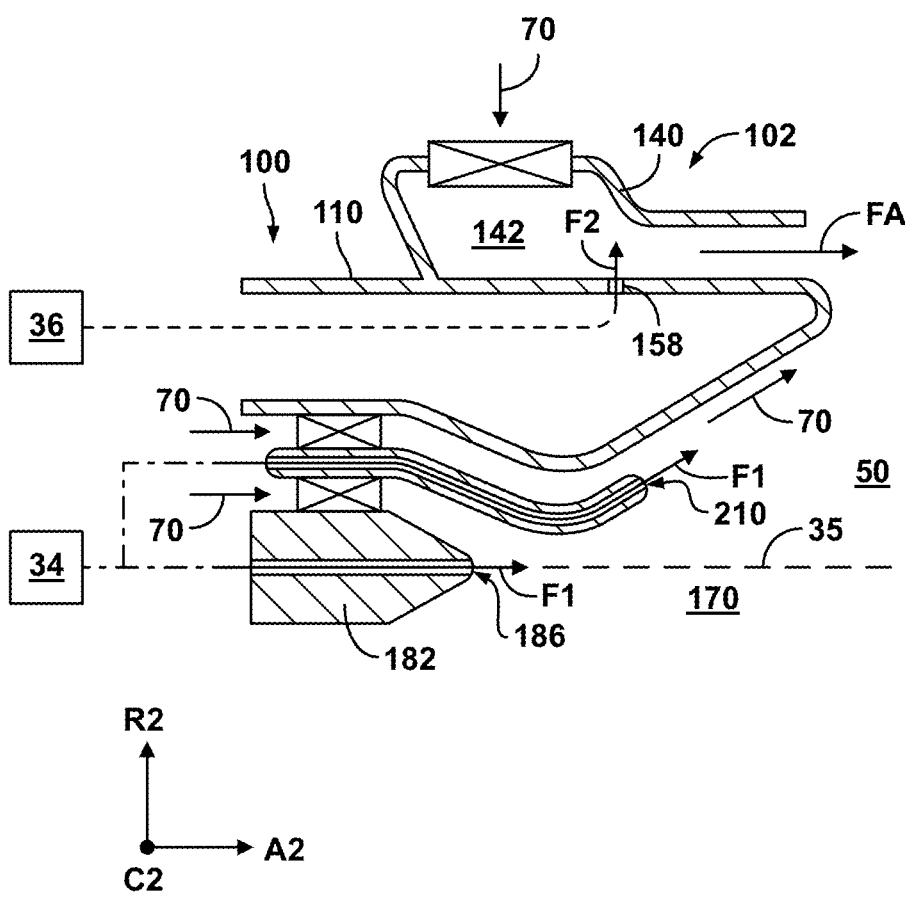
FIG. 7 is a schematic cross-sectional view illustrating portions of a fuel nozzle assembly in accordance with various aspects described herein.

Referring to FIG. 7, the outer wall fuel orifice 158 of the outer wall 110 of the fuel nozzle 100 can be directly radially oriented (e.g., parallel with the second radial direction R2) and can be fluidly coupled with the second fuel supply 36 to emit the second fuel F2 directly radially outward toward the main mixer wall 140 of the main mixer 102 and into the main mixing chamber 142 to mix with air 70 and form the fuel-air mixture FA. The pilot fuel orifice 186 of the pilot body 182, the splitter fuel orifice 210, or both can be fluidly coupled with the first fuel supply 34 to emit the first fuel F1 into the pilot channel 170, the combustion chamber 50, or both. The first fuel F1 can, for example, comprise natural gas.

Figure 8:
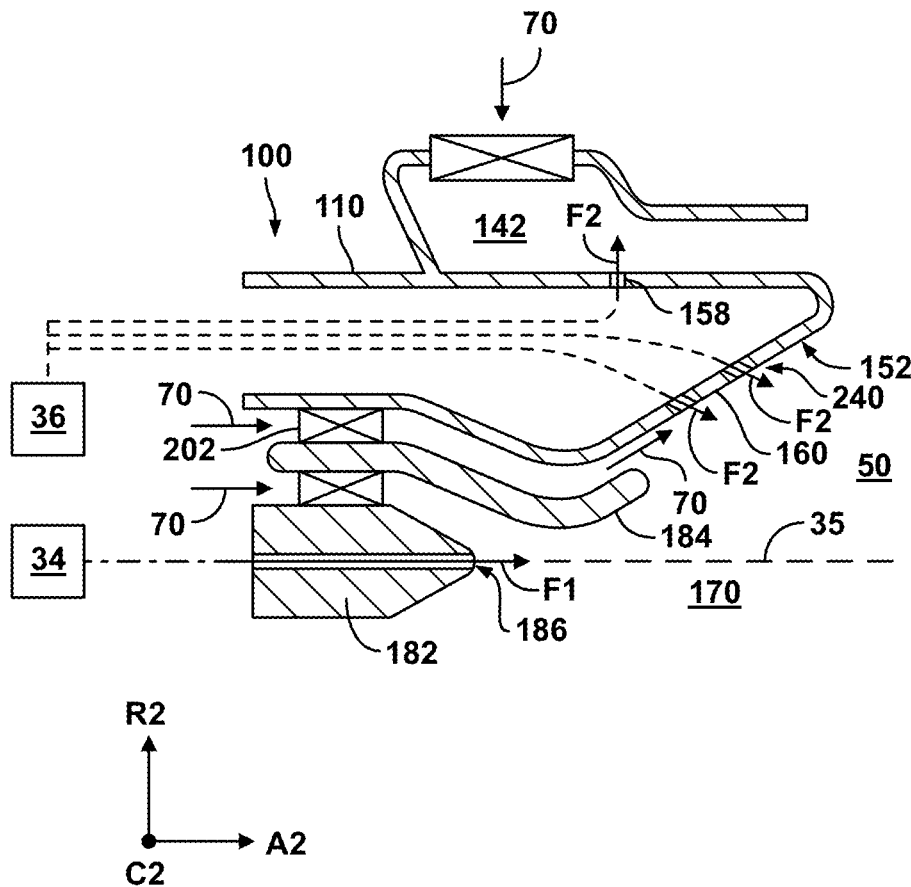
FIG. 8 is a schematic cross-sectional view illustrating portions of a fuel nozzle assembly in accordance with various aspects described herein.
Figure 9:
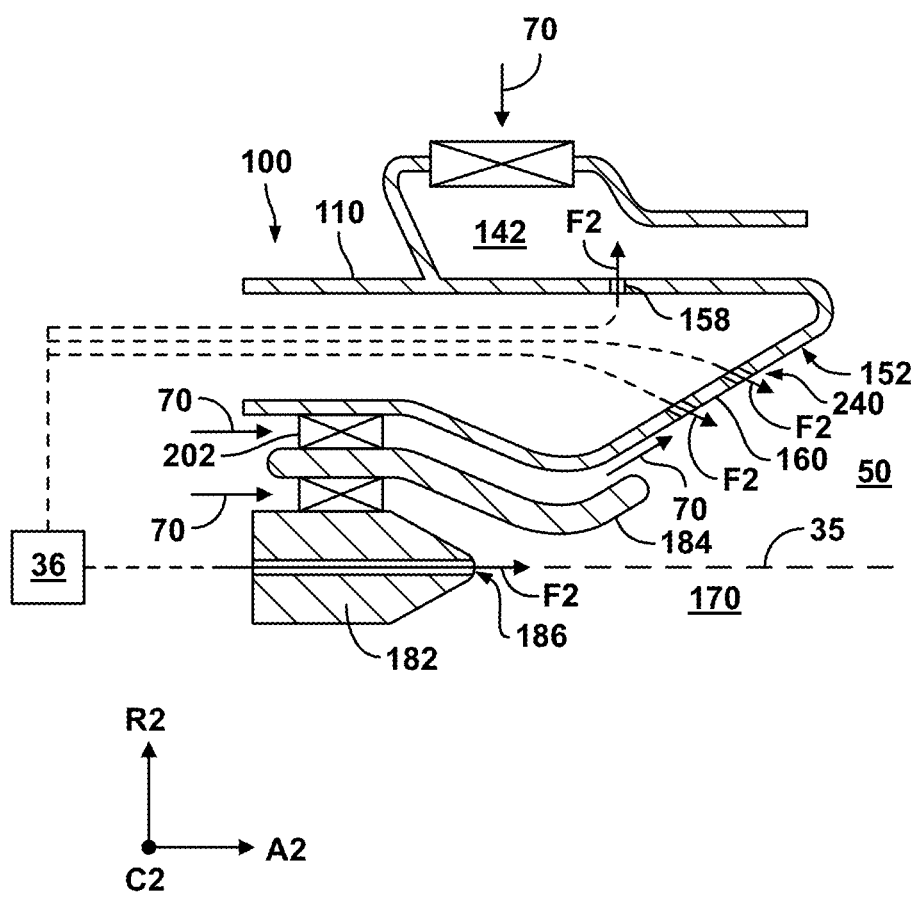
FIG. 9 is a schematic cross-sectional view illustrating portions of a fuel nozzle assembly in accordance with various aspects described herein.

Referring to FIGS. 8 and 9, the outer wall 110 of the fuel nozzle 100 can include a set of second fuel orifices 240. The set of second fuel orifices 240 can emit fuel, such as at least one of the first fuel F1 or the second fuel F2, into the pilot channel 170, the combustion chamber 50, or both. In the examples shown in FIGS. 8 and 9, the set of second fuel orifices 240 are shown as fluidly coupled with the second fuel supply 36, but the set of second fuel orifices 240 can, additionally or alternatively, be fluidly coupled with the first fuel supply 34 (FIG. 8). The set of second fuel orifices 240 can be disposed at the conical surface 160 of the pilot cone 152. The set of second fuel orifices 240 can include orifices that are axially spaced, radially spaced, circumferentially spaced, or combinations thereof. The set of second fuel orifices 240 can be axially oriented to emit fuel in the second axial direction A2 or at least partially radially oriented, such as to emit fuel radially inward toward the fuel nozzle assembly centerline 35, at least to some degree. In some examples, the set of second fuel orifices 240 can be angled to generate cross-flow with air 70 flowing radially outward and aft in the pilot channel 170, such as swirled air 70 from the second pilot swirler 202 flowing along the conical surface 160. The outer wall fuel orifice 158 and the set of second fuel orifices 240 can be fluidly coupled to the second fuel supply 36 to emit the second fuel F2 into the main mixing chamber 142 and the pilot channel 170, respectively. Referring to FIG. 8, the pilot fuel orifice 186 of the pilot body 182 can be fluidly coupled with the first fuel supply 34 to emit the first fuel F1 (e.g., liquid fuel or natural gas) into the pilot channel 170, the combustion chamber 50, or both. Referring to FIG. 9, the pilot fuel orifice 186 of the pilot body 182 can be fluidly coupled with the second fuel supply 36 to emit the second fuel F2 (e.g., gaseous hydrogen) into the pilot channel 170. For example, the fuel nozzle assembly 48 can emit the second fuel F2 through all of the fuel orifices 158, 186, 240, such as without emitting the first fuel F1 (FIG. 8).

Figure 10:
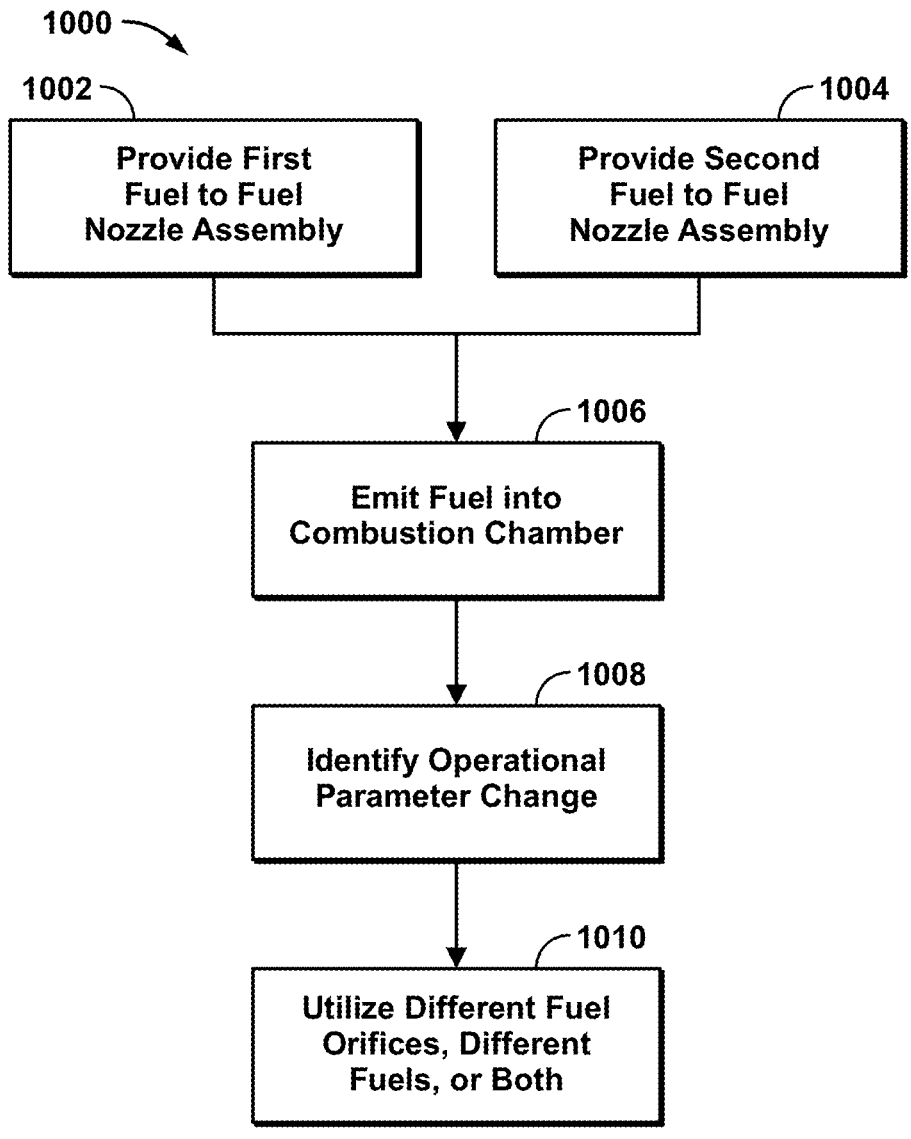
FIG. 10 is a flow diagram illustrating a method of operating a gas turbine engine in accordance with various aspects described herein.

Referring to FIG. 10, a method 1000 of operating a gas turbine engine is illustrated. The method 1000 can be utilized with the gas turbine engine 10 and components thereof, such as generally illustrated in FIGS. 1-9. The method 1000 can include providing the first fuel F1 to the fuel nozzle assembly 48 (block 1002), such as from the first fuel supply 34. Additionally or alternatively, the method 1000 can include providing the second fuel F2 to the fuel nozzle assembly 48 (block 1004), such as from the second fuel supply 36.

The method 1000 can include emitting fuel, such as the first fuel F1, the second fuel F2, or both, from the fuel nozzle 100 into the combustion chamber 50 (block 1006), which can include emitting fuel into the main mixing chamber 142, the pilot channel 170, or a combination thereof, such as via one or more fuel orifices 158, 186, 210, 240. Emitting the first fuel F1 (e.g., liquid fuel or natural gas) from the fuel nozzle 100 can include emitting the first fuel F1 in the second axial direction A2 of the fuel nozzle assembly 48 from the pilot fuel orifice 186 into the pilot channel 170 toward the combustion chamber 50. Additionally or alternatively, emitting the first fuel F1 from the fuel nozzle 100 can include emitting the first fuel F1 radially outward and aft from the splitter fuel orifice 210. Fuel emitted from the pilot fuel orifice 186, the splitter fuel orifice 210, or both, can mix with air 70, such as swirled air 70 from one or both of the first pilot swirler 200 or the second pilot swirler 202, in the pilot channel 170 prior to entering the combustion chamber 50, can mix with air 70 in the combustion chamber 50, or both.

Emitting the second fuel F2 (e.g., hydrogen gas) into the combustion chamber 50 can include emitting the second fuel F2 radially outward from an outer surface 112 of the fuel nozzle 100, such as from the outer wall fuel orifice 158 toward the main mixer wall 140. Emitting the second fuel F2 radially outward can include emitting the second fuel F2 directly radially outward or radially outward and aft. Emitting the second fuel F2 into the combustion chamber 50 can, additionally or alternatively, include emitting the second fuel F2 from one or more of the pilot fuel orifice 186, the splitter fuel orifice 210, or the set of second fuel orifices 240. In some examples, the fuel nozzle 100 can emit the first fuel F1 and the second fuel F2 through the pilot fuel orifice 186. For example, the fuel nozzle 100 can emit the first fuel F1 through an axially oriented orifice of the pilot fuel orifice 186, and the fuel nozzle 100 can emit the second fuel F2 through one or more radially oriented orifices of the pilot fuel orifice 186.

The method 1000 can include identifying a change in an operational parameter of the gas turbine engine 10 or a vehicle (e.g., an aircraft) coupled thereto (block 1008). The change can be identified via the controller 60, one or more sensors in communication with the controller 60, or a combination thereof. The operational parameter can include one or more of thrust demand, an amount of the first fuel F1 available, an amount of the second fuel F2 available, or other parameters. The method 1000 can, in response to identifying the change in the operational parameter, include adjusting a fuel output (block 1010), which can include utilizing a different one or a combination of the fuel orifices 158, 186, 210, 240, providing different fuel to one or a combination of the fuel orifices 158, 186, 210, 240, utilizing different amounts of the first fuel F1 and the second fuel F2, or combinations thereof (block 1010). For example, if the controller 60 determines that there is an insufficient amount of the first fuel F1 to emit via the pilot fuel orifice 186 and the splitter fuel orifice 210, the controller 60 may control one or more of the first fuel supply 34, the second fuel supply 36, or the fuel nozzle 100 to provide the first fuel F1 to only the pilot fuel orifice 186 or to provide the second fuel F2 to one or both of the pilot fuel orifice 186 or the splitter fuel orifice 210.

In some examples, the controller 60 may adjust the fuel output by controlling the fuel nozzle assembly 48 to emit the second fuel F2 (e.g., hydrogen) during certain phases of a flight, such as approach, which can limit coking by purging unburnt liquid fuel from the combustion section. Utilizing only hydrogen fuel during certain phases of a flight, such as cruise and approach, can result in zero carbon emissions (e.g., zero carbon dioxide). Utilizing hydrogen fuel can reduce the length of the combustor 30 as mixing times can be reduced. Utilizing only hydrogen fuel at low power can limit or prevent smoke. Utilizing (e.g., the first fuel F1) liquid fuel during at least some phases of a flight, such as take-off and climb, can limit temperatures to improve durability and limit NOx emissions.

While described with respect to a turbine engine, it should be appreciated that the combustor as described herein can be for any engine having a combustor. It should be appreciated that application of aspects of the disclosure discussed herein are applicable to engines with propeller sections or fan and booster sections along with turbojets and turbo engines as well.

To the extent not already described, the different features and structures of the various embodiments can be used in combination, or in substitution with each other as desired. That one feature is not illustrated in all of the embodiments is not meant to be construed that it cannot be so illustrated but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A gas turbine engine, comprising: a compressor section, combustion section, and turbine section in serial flow arrangement, with the combustion section comprising: a combustor liner at least partially defining a combustion chamber; a wall coupled to the combustor liner; a first fuel supply to supply a first fuel; a gaseous fuel supply to supply a gaseous hydrogen fuel; and a fuel nozzle assembly coupled to the wall and fluidly coupled to the first fuel supply and the gaseous fuel supply, the fuel nozzle assembly comprising: a main mixer; and a fuel nozzle disposed such that the main mixer is disposed at least partially around the fuel nozzle, the fuel nozzle comprising: an outer wall defining a pilot channel; an outer wall fuel orifice extending through the outer wall and fluidly coupled with the first fuel supply and the gaseous fuel supply to emit at least one of the first fuel or the gaseous hydrogen fuel radially outward into the main mixer; and a secondary mixer disposed in the pilot channel.

The gas turbine engine of any preceding clause, wherein the first fuel comprises natural gas or liquid fuel.

The gas turbine engine of any preceding clause, wherein the main mixer is coupled with the wall such that a cavity is provided between the main mixer and the wall.

The gas turbine engine of any preceding clause, wherein a trailing edge of the outer wall includes a trailing edge fuel orifice aft of the outer wall fuel orifice.

The gas turbine engine of any preceding clause, wherein the trailing edge fuel orifice is directed radially outward.

The gas turbine engine of any preceding clause, wherein the trailing edge of the outer wall is aft of an outlet of the main mixer.

The gas turbine engine of any preceding clause, wherein the secondary mixer includes a pilot body and a pilot splitter spaced radially outward of the pilot body; and wherein the pilot body includes a pilot fuel orifice fluidly coupled to at least one of the first fuel supply or the gaseous fuel supply.

The gas turbine engine of any preceding clause, wherein the pilot fuel orifice is directly radially outward toward the pilot splitter to emit the first fuel or the gaseous hydrogen fuel in a cross-flow with air flowing through the pilot channel.

The gas turbine engine of any preceding clause, wherein the secondary mixer includes a first pilot swirler disposed between the pilot splitter and the pilot body, and a second pilot swirler disposed between the pilot splitter and the outer wall.

The gas turbine engine of any preceding clause, wherein the main mixer includes a main mixer swirler; and wherein the main mixer swirler is a radial swirler, and the first pilot swirler and the second pilot swirler are axial swirlers.

The gas turbine engine of any preceding clause, wherein the pilot splitter comprises a splitter fuel orifice fluidly coupled to at least one of the first fuel supply or the gaseous fuel supply.

The gas turbine engine of any preceding clause, wherein the outer wall at least partially defines a pilot cone comprising a set of second fuel orifices.

The gas turbine engine of any preceding clause, wherein the set of second fuel orifices are fluidly coupled with the gaseous fuel supply.

The gas turbine engine of any preceding clause, wherein the set of second fuel orifices are disposed to emit the gaseous hydrogen fuel in cross-flow with air emitted from a pilot swirler disposed in the pilot channel forward of the set of second fuel orifices.

The gas turbine engine of any preceding clause, wherein the wall includes a first flame shaping aperture aft of the outer wall fuel orifice.

The gas turbine engine of any preceding clause, wherein the wall includes a second flame shaping aperture aft of the first flame shaping aperture and directed radially inward.

The gas turbine engine of any preceding clause, wherein the second flame shaping aperture is aft of an outlet of the main mixer.

The gas turbine engine of any preceding clause, wherein the first flame shaping aperture is radially outward and forward of the outlet of the main mixer; and wherein the second flame shaping aperture is radially outward of the first flame shaping aperture.

The gas turbine engine of any preceding clause, wherein the main mixer and the wall define a cavity; and wherein the first flame shaping aperture extends through the wall to emit air into the cavity.

The gas turbine engine of any preceding clause, wherein the outer wall defines a radial recess, and the outer wall fuel orifice is disposed in the radial recess.

The gas turbine engine of any preceding clause, wherein the wall includes a first radial portion, a first curved portion, an axial portion, and a second curved portion.

The gas turbine engine of any preceding clause, wherein the first curved portion and the second curved portion are disposed in a double-wall configuration.

The gas turbine engine of any preceding clause, wherein the outer wall includes a trailing edged defining a pilot conc.

The gas turbine engine of any preceding clause, wherein the fuel nozzle assembly includes a pilot splitter disposed, at least in part, radially between a pilot body and the outer wall to split a pilot channel into a first pilot channel section between the pilot body and the pilot splitter, and a second pilot channel section between the pilot splitter and an inner portion of the outer wall.

The gas turbine engine of any preceding clause, wherein the outer wall includes defines a recess including a first angled surface and a second angled surface disposed in a V-shaped configuration that opens radially outward.

The gas turbine engine of any preceding clause, wherein the first angled surface is angled such that the first angled surface faces radially outward and aft; and wherein the second angled surface is angled such that the second angled surface faces radially outward and forward.

The gas turbine engine of any preceding clause, wherein the outer wall fuel orifice is disposed at the first angled surface such that the outer wall fuel orifice is partially radially oriented to emit the first fuel, the second fuel, or both, radially outward and aft.

The gas turbine engine of any preceding clause, wherein the outer wall fuel orifice is disposed at the second angled surface such that the outer wall fuel orifice is partially radially oriented to emit the first fuel, the second fuel, or both, radially outward and forward.

A fuel nozzle assembly for a gas turbine engine, the fuel nozzle assembly comprising: a main mixer; and a fuel nozzle disposed such that the main mixer is disposed at least partially around the fuel nozzle, the fuel nozzle comprising: an outer wall defining a pilot channel; an outer wall fuel orifice extending through the outer wall to emit at least one of a first fuel or a gaseous hydrogen fuel radially outward into the main mixer; and a secondary mixer disposed in the pilot channel.

The fuel nozzle assembly of any preceding clause, wherein the first fuel comprises natural gas or liquid fuel.

The fuel nozzle assembly of any preceding clause 1, wherein the main mixer is configured for coupling with a wall such that a cavity is provided between the main mixer and the wall.

The fuel nozzle assembly of any preceding clause, wherein a trailing edge of the outer wall includes a trailing edge fuel orifice aft of the outer wall fuel orifice.

The fuel nozzle assembly of any preceding clause, wherein the trailing edge fuel orifice is directed radially outward.

The fuel nozzle assembly of any preceding clause, wherein the trailing edge of the outer wall is aft of an outlet of the main mixer.

The fuel nozzle assembly of any preceding clause, wherein the secondary mixer includes a pilot body and a pilot splitter spaced radially outward of the pilot body; and wherein the pilot body includes a pilot fuel orifice fluidly coupled to at least one of the first fuel supply or the gaseous fuel supply.

The fuel nozzle assembly of any preceding clause, wherein the pilot fuel orifice is directly radially outward toward the pilot splitter to emit the first fuel or the gaseous hydrogen fuel in a cross-flow with air flowing through the pilot channel.

The fuel nozzle assembly of any preceding clause, wherein the secondary mixer includes a first pilot swirler disposed between the pilot splitter and the pilot body, and a second pilot swirler disposed between the pilot splitter and the outer wall.

The fuel nozzle assembly of any preceding clause, wherein the main mixer includes a main mixer swirler; and wherein the main mixer swirler is a radial swirler, and the first pilot swirler and the second pilot swirler are axial swirlers.

The fuel nozzle assembly of any preceding clause, wherein the pilot splitter comprises a splitter fuel orifice fluidly coupled to at least one of the first fuel supply or the gaseous fuel supply.

The fuel nozzle assembly of any preceding clause, wherein the outer wall at least partially defines a pilot cone comprising a set of second fuel orifices.

The fuel nozzle assembly of any preceding clause, wherein the set of second fuel orifices are fluidly coupled with the gaseous fuel supply.

The fuel nozzle assembly of any preceding clause, wherein the set of second fuel orifices are disposed to emit the gaseous hydrogen fuel in cross-flow with air emitted from a pilot swirler disposed in the pilot channel forward of the set of second fuel orifices.

The fuel nozzle assembly of any preceding clause, wherein the wall includes a first flame shaping aperture aft of the outer wall fuel orifice.

The fuel nozzle assembly of any preceding clause, wherein the wall includes a second flame shaping aperture aft of the first flame shaping aperture and directed radially inward.

The fuel nozzle assembly of any preceding clause, wherein the second flame shaping aperture is aft of an outlet of the main mixer.

The fuel nozzle assembly of any preceding clause, wherein the first flame shaping aperture is radially outward and forward of the outlet of the main mixer; and wherein the second flame shaping aperture is radially outward of the first flame shaping aperture.

The fuel nozzle assembly of any preceding clause, wherein the main mixer and the wall define a cavity; and wherein the first flame shaping aperture extends through the wall to emit air into the cavity.

The fuel nozzle assembly of any preceding clause, wherein the outer wall defines a radial recess, and the outer wall fuel orifice is disposed in the radial recess.

A method of operating the gas turbine engine of any preceding clause, the method comprising providing a first fuel to the fuel nozzle assembly; providing a second fuel to the fuel nozzle assembly, emitting fuel into the combustion chamber, identifying an operational parameter change, and utilizing different fuel orifices, different fuels, or both.

An electronic controller configured to implement the method of any preceding clause.

An electronic controller configured to control operation of the gas turbine engine of any preceding clause.

An electronic controller configuration to control operation of the fuel nozzle assembly of any preceding clause.

The electronic controller of any preceding clause, comprising a processor and a memory.

What is claimed is:

1. A gas turbine engine, comprising:
a compressor section, combustion section, and turbine section in serial flow arrangement, with the combustion section comprising:
a combustor liner at least partially defining a combustion chamber;
a wall coupled to the combustor liner;
a first fuel supply to supply a first fuel;
a gaseous fuel supply to supply a gaseous hydrogen fuel; and
a fuel nozzle assembly coupled to the wall and fluidly coupled to the first fuel supply and the gaseous fuel supply, the fuel nozzle assembly comprising:
a main mixer, the main mixer and the wall defining a cavity; and
a fuel nozzle disposed such that the main mixer is disposed at least partially around the fuel nozzle, the fuel nozzle comprising:
an outer wall defining a pilot channel;
an outer wall fuel orifice extending through the outer wall and fluidly coupled with the first fuel supply and the gaseous fuel supply to emit at least one of the first fuel or the gaseous hydrogen fuel radially outward into the main mixer;
a secondary mixer disposed in the pilot channel; and
a first flame shaping aperture extending through the wall to emit air into the cavity, wherein the outer wall at least partially defines a pilot cone comprising a set of second fuel orifices.

2. The gas turbine engine of claim 1, wherein the first fuel comprises natural gas or liquid fuel.

3. The gas turbine engine of claim 1, wherein a trailing edge of the outer wall includes a trailing edge fuel orifice aft of the outer wall fuel orifice.

4. The gas turbine engine of claim 3, wherein the trailing edge fuel orifice is directed radially outward.

5. The gas turbine engine of claim 3, wherein the trailing edge of the outer wall is aft of an outlet of the main mixer.

6. The gas turbine engine of claim 1, wherein the secondary mixer includes a pilot body and a pilot splitter spaced radially outward of the pilot body; and
wherein the pilot body includes a pilot fuel orifice fluidly coupled to at least one of the first fuel supply or the gaseous fuel supply.

7. The gas turbine engine of claim 6, wherein the pilot fuel orifice is directed radially outward toward the pilot splitter to emit the first fuel or the gaseous hydrogen fuel in a cross-flow with air flowing through the pilot channel.

8. The gas turbine engine of claim 6, wherein the secondary mixer includes a first pilot swirler disposed between the pilot splitter and the pilot body, and a second pilot swirler disposed between the pilot splitter and the outer wall.

9. The gas turbine engine of claim 8, wherein the main mixer includes a main mixer swirler; and
wherein the main mixer swirler is a radial swirler, and the first pilot swirler and the second pilot swirler are axial swirlers.

10. The gas turbine engine of claim 8, wherein the pilot splitter comprises a splitter fuel orifice fluidly coupled to at least one of the first fuel supply or the gaseous fuel supply.

11. The gas turbine engine of claim 1, wherein the set of second fuel orifices are fluidly coupled with the gaseous fuel supply.

12. The gas turbine engine of claim 11, wherein the set of second fuel orifices are disposed to emit the gaseous hydrogen fuel in cross-flow with air emitted from a pilot swirler disposed in the pilot channel forward of the set of second fuel orifices.

13. A gas turbine engine, comprising:
a compressor section, combustion section, and turbine section in serial flow arrangement, with the combustion section comprising:
a combustor liner at least partially defining a combustion chamber;
a wall coupled to the combustor liner;
a first fuel supply to supply a first fuel;
a gaseous fuel supply to supply a gaseous hydrogen fuel; and
a fuel nozzle assembly coupled to the wall and fluidly coupled to the first fuel supply and the gaseous fuel supply, the fuel nozzle assembly comprising:
a main mixer, the main mixer and the wall defining a cavity; and
a fuel nozzle disposed such that the main mixer is disposed at least partially around the fuel nozzle, the fuel nozzle comprising:
an outer wall defining a pilot channel;
an outer wall fuel orifice extending through the outer wall and fluidly coupled with the first fuel supply and the gaseous fuel supply to emit at least one of the first fuel or the gaseous hydrogen fuel radially outward into the main mixer;
a secondary mixer disposed in the pilot channel; and
a first flame shaping aperture extending through the wall to emit air into the cavity, wherein the first flame shaping aperture is aft of the outer wall fuel orifice.

14. The gas turbine engine of claim 13, wherein the wall includes a second flame shaping aperture aft of the first flame shaping aperture and directed radially inward.

15. The gas turbine engine of claim 14, wherein the second flame shaping aperture is aft of an outlet of the main mixer.

16. The gas turbine engine of claim 15, wherein the first flame shaping aperture is radially outward and forward of the outlet of the main mixer; and wherein the second flame shaping aperture is radially outward of the first flame shaping aperture.

17. A gas turbine engine, comprising:

a compressor section, combustion section, and turbine section in serial flow arrangement, with the combustion section comprising:

a combustor liner at least partially defining a combustion chamber;

a wall coupled to the combustor liner;

a first fuel supply to supply a first fuel;

a gaseous fuel supply to supply a gaseous hydrogen fuel; and a fuel nozzle assembly coupled to the wall and fluidly coupled to the first fuel supply and the gaseous fuel supply, the fuel nozzle assembly comprising:

a main mixer; and a fuel nozzle disposed such that the main mixer is disposed at least partially around the fuel nozzle, the fuel nozzle comprising:

an outer wall defining a pilot channel;

an outer wall fuel orifice extending through the outer wall and fluidly coupled with the first fuel supply and the gaseous fuel supply to emit at least one of the first fuel or the gaseous hydrogen fuel radially outward into the main mixer; and a secondary mixer disposed in the pilot channel;

wherein the wall includes a first flame shaping aperture aft of the outer wall fuel orifice and a second flame shaping aperture aft of the first flame shaping aperture, the second flame shaping aperture directed radially inward and aft of an outlet of the main mixer, the first flame shaping aperture positioned radially outward and forward of the outlet of the main mixer and the second flame shaping aperture positioned radially outward of the first flame shaping aperture;

wherein the main mixer and the wall define a cavity; and wherein the first flame shaping aperture extends through the wall to emit air into the cavity.

18. The gas turbine engine of claim 1, wherein the outer wall defines a radial recess, and the outer wall fuel orifice is disposed in the radial recess.

\* \* \* \* \*